US009902561B2

(12) United States Patent
Tummala et al.

(10) Patent No.: US 9,902,561 B2
(45) Date of Patent: Feb. 27, 2018

(54) SYSTEM FOR DISCHARGING DRY SOLIDS AND AN ASSOCIATED METHOD THEREOF

(71) Applicant: General Electric Company, Schenectady, NY (US)

(72) Inventors: Yashwanth Tummala, Niskayuna, NY (US); Tiffany Elizabeth Pinard Westendorf, Troy, NY (US)

( * ) Notice: Subject to any disclaimer, the term of this patent is extended or adjusted under 35 U.S.C. 154(b) by 109 days.

(21) Appl. No.: 14/926,376

(22) Filed: Oct. 29, 2015

(65) Prior Publication Data
US 2017/0121116 A1 May 4, 2017

(51) Int. Cl.
G01F 11/10 (2006.01)
B65G 11/20 (2006.01)
B65G 11/02 (2006.01)

(52) U.S. Cl.
CPC ......... *B65G 11/203* (2013.01); *B65G 11/026* (2013.01)

(58) Field of Classification Search
CPC .... B65G 11/203; B65G 11/026; B65G 53/10; B65G 53/4625; B65G 53/4633
USPC ......... 222/368, 636, 367; 110/261; 406/154, 406/63–67; 208/174; 162/246, 52
See application file for complete search history.

(56) References Cited

U.S. PATENT DOCUMENTS

| 2,858,212 | A | 10/1958 | Durant et al. |
| 3,397,801 | A | 8/1968 | Day |
| 3,775,071 | A | 11/1973 | Hoffert et al. |
| 4,557,403 | A | 12/1985 | Stevenson |
| 5,265,983 | A | 11/1993 | Wennerstrom et al. |
| 5,560,550 | A | 10/1996 | Krawczyk |
| 5,657,704 | A | 8/1997 | Schueler |
| 5,997,220 | A * | 12/1999 | Wormser ........... B65G 53/4616 222/367 |
| 6,641,336 | B1 * | 11/2003 | Bolles ...................... D21C 7/06 406/183 |
| 6,966,466 | B2 | 11/2005 | Jensen |
| 7,757,903 | B2 * | 7/2010 | Schwartz ........... B65G 53/4633 110/276 |
| 2007/0138211 | A1 | 6/2007 | O'Leary et al. |
| 2010/0266351 | A1 * | 10/2010 | Vogel ....................... D21C 3/24 406/64 |
| 2012/0067702 | A1 * | 3/2012 | Frey ................... B65G 53/4633 198/642 |
| 2012/0182827 | A1 | 7/2012 | Bairamijamal |

OTHER PUBLICATIONS

R.V.Wardell,"Solids preparation and handling", Pressurized Fluidized Bed Combustion, 1995, pp. 135-163.

* cited by examiner

Primary Examiner — Jeremy W Carroll
(74) Attorney, Agent, or Firm — Pabitra K. Chakrabarti

(57) ABSTRACT

A system for discharging dry solids into high pressure environments is disclosed. The system includes a hopper, a feeder device coupled to the hopper, and a discharge device disposed downstream relative to the feeder device. The feeder device includes a rotatable casing including a plurality of pockets, a stationary core disposed within the rotatable casing, and a plurality of valves. Each pocket includes an inlet, an outlet, and a plurality of first through-holes. The stationary core includes a plurality of channels, where each channel includes a plurality of second through-holes. Each valve is disposed at the outlet of a corresponding pocket from the plurality of pockets. The discharge device includes a valve actuator configured to actuate each valve.

9 Claims, 7 Drawing Sheets

SYSTEM FOR DISCHARGING DRY SOLIDS AND AN ASSOCIATED METHOD THEREOF

BACKGROUND

The present disclosure relates to a method and system for discharging dry solids, such as incompressible dry solids into a high pressure environment.

Continuously discharging low or atmospheric pressure dry solids into high pressure environments is generally a difficult task because solids typically have a high inter-particle volume through which pressurized fluids used to pressurize the dry solids may flow through, resulting in leakage of the pressurized fluids.

Some conventional systems, for example, a rotary valve system and a rotary air-lock system may be configured to rotate about a horizontal axis while pressurizing dry solids and discharging pressurized dry solids into a high pressure environment. However, such conventional systems have limited pressure capability due to deflection of the systems under high pressure conditions. Further, such conventional systems may be susceptible to wear while pressurizing and discharging abrasive dry solids. Such conventional systems may also lack active venting (de-pressurizing) after discharging the dry solids into the high pressure environment.

Another conventional feeder system, such as a lock hopper system, may be configured to discharge the pressurized dry solids in batch mode. Such a conventional system has a limited pressure capability and may be susceptible to wear while pressurizing and discharging abrasive dry solids.

Accordingly, there is a need for an improved feeder system and an associated method for pressurizing and discharging dry solids into a high pressure environment.

BRIEF DESCRIPTION

In accordance with one exemplary embodiment, a system for discharging dry solids is disclosed. The system includes a hopper, a feeder device coupled to the hopper, and a discharge device disposed downstream relative to the feeder device. The feeder device includes a rotatable casing having a plurality of pockets, a stationary core disposed within the rotatable casing, and a plurality of valves. Each pocket among the plurality of pockets includes an inlet, an outlet, and a plurality of first through-holes. The stationary core includes a plurality of channels, wherein each channel among the plurality of channels includes a plurality of second through-holes. Each valve among the plurality of valves is disposed at the outlet of a corresponding pocket from the plurality of pockets. The discharge device includes a valve actuator configured to actuate each valve.

In accordance with one exemplary embodiment, a method for discharging dry solids is disclosed. The method involves feeding dry solids at atmospheric pressure, from a hopper into a first pocket among a plurality of pockets formed in a rotatable casing of a feeder device. Each pocket among the plurality of pockets includes an inlet, an outlet, and a plurality of first through-holes. The feeder device further includes a plurality of valves, each valve being disposed at the outlet of a corresponding pocket from the plurality of pockets. The method further involves driving the rotatable casing about a stationary core of the feeder device, which is disposed within the rotatable casing. The stationary core includes a plurality of channels, each channel including a plurality of second through-holes. Further, the method involves injecting a pressurized fluid from a first channel among the plurality of channels into the first pocket through the plurality of corresponding second through-holes and the plurality of corresponding first through-holes, to generate pressurized dry solids. The method also involves actuating a corresponding valve from the plurality of valves through a valve actuator of a discharge device, for discharging the pressurized dry solids from the first pocket into the discharge device. The method further involves extracting the pressurized fluid from the first pocket through the plurality of corresponding first and second through-holes and the first channel.

DRAWINGS

These and other features and aspects of embodiments of the present invention will become better understood when the following detailed description is read with reference to the accompanying drawings in which like characters represent like parts throughout the drawings, wherein.

DETAILED DESCRIPTION

Embodiments discussed herein disclose a system, for example, a feeder system configured to pressurize dry solids and discharge pressurized dry solids into a high pressure environment. The exemplary feeder system is configured to rotate about a vertical axis, for example, a central axis for pressurizing and discharging the dry solids into the high pressure environment, such as a pressurized blender of a carbon di-oxide ($CO_2$) fracturing system. In certain embodiments, the feeder system may be configured to continuously discharge the pressurized dry solids into the pressurized blender. The pressurized blender is configured to blend the pressurized dry solids and a liquefied gas to form a mixture before delivering to a downstream component of the fracturing system. In some embodiments, the dry solids may be incompressible and abrasive. In certain embodiments, such a feeder system includes a hopper, a feeder device coupled to the hopper, and a discharge device disposed downstream relative to the feeder device. The feeder device includes a rotatable casing including a plurality of pockets, a stationary core disposed within the rotatable casing, and a plurality of valves. Each pocket among the plurality of pockets includes an inlet, an outlet, and a plurality of first through-holes. The stationary core includes a plurality of channels, where each channel among the plurality of channels includes a plurality of second through-holes. Each valve among the plurality of valves is disposed at the outlet of a corresponding pocket from the plurality of pockets. The discharge device includes a valve actuator configured to actuate each valve.

Figure 1:
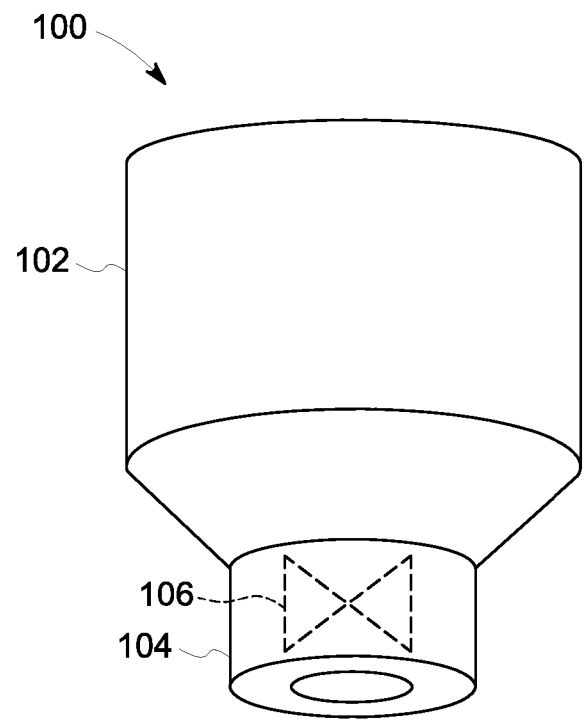
FIG. 1 is a perspective view of a hopper in accordance with one exemplary embodiment.

FIG. 1 illustrates a perspective side view of a hopper 100 in accordance with one exemplary embodiment. The hopper 100 has a funnel shape and is configured to feed dry solids to a feeder device (not shown in FIG. 1). In the illustrated embodiment, the hopper 100 includes a storage portion 102 and a discharge portion 104 coupled to the storage portion 102. In certain embodiments, the storage portion 102 may receive the dry solids at atmospheric pressure from a source (not shown in FIG. 1) and temporarily store the dry solids before discharging to the feeder device via the discharge portion 104. The term "atmospheric pressure" may be referred to as a force exerted by atmospheric air on the dry solids.

The hopper 100 further includes a metering device 106 disposed within the discharge portion 104. In certain embodiments, the metering device 106 is a valve. The metering device 106 is configured to regulate discharge of dry solids to the feeder device. Specifically, the metering device 106 is configured to control a flow rate of the dry solids from the storage portion 102 to the feeder device via the discharge portion 104. The metering device 106 is configured to minimize clogging of the dry solids within the feeder device.

Figure 2:
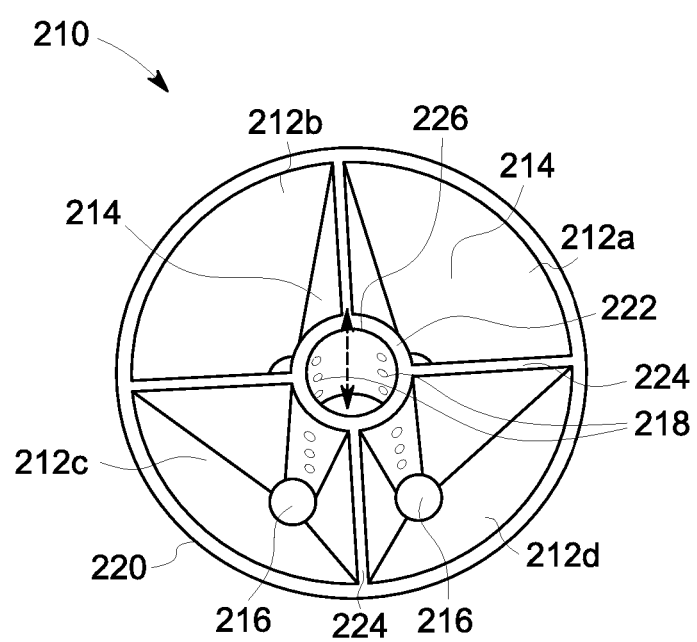
FIG. 2 is a schematic perspective view of a rotatable casing of a feeder device in accordance with one exemplary embodiment.

FIG. 2 illustrates a schematic perspective view of a rotatable casing 210 of a feeder device in accordance with one exemplary embodiment. In the illustrated embodiment, the rotatable casing 210 has a substantially conical shape and is configured to rotate about a stationary core (not shown in FIG. 2) of the feeder device.

The rotatable casing 210 includes a plurality of pockets, for example, 212a, 212b, 212c, 212d. Each pocket 212a, 212b, 212c, 212d includes an inlet 214, an outlet 216, and a plurality of first through-holes 218. Specifically, the rotatable casing 210 includes a first outer-peripheral wall 220, a first inner-peripheral wall 222, and a plurality of first partition-walls 224 spaced apart from each other and extending from the first outer-peripheral wall 220 to the first inner-peripheral wall 222 to define the plurality of pockets 212a, 212b, 212c, 212d. The first inner-peripheral wall 222 includes the plurality of first through-holes 218 corresponding to each pocket 212a, 212b, 212c, 212d.

The number of pockets may vary depending on the application and design criteria. During operation, the rotatable casing 210 is configured to rotate about a central axis 226 of the feeder system such that each pocket 212a, 212b, 212c, 212d moves through a plurality of stages to continuously pressurize and discharge pressurized dry solids to a high pressure environment. The plurality of stages includes a i) feeding stage, ii) pressurizing stage, iii) discharging stage, and iv) depressurizing stage. The plurality of stages is explained in greater detail below with reference to subsequent figures.

Figure 3:
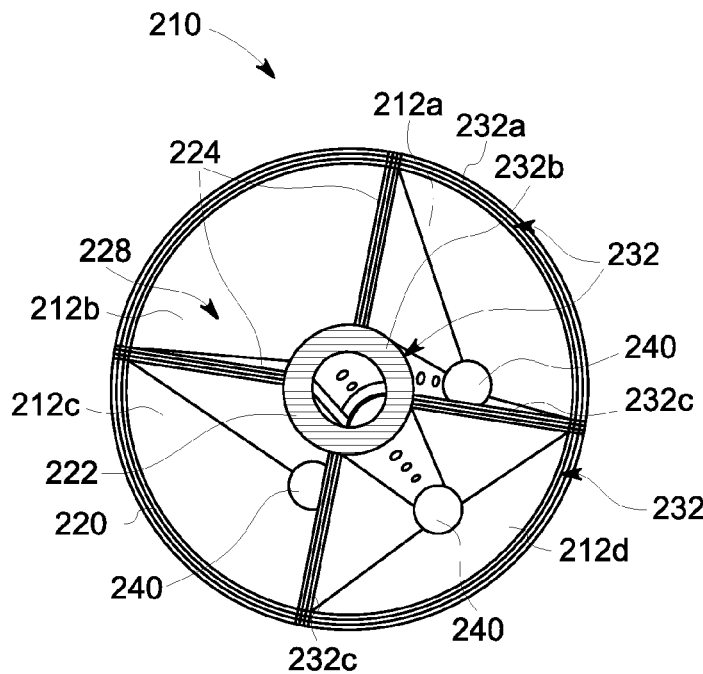
FIG. 3 is a perspective view of a rotatable casing and a plurality of valves of a feeder device in accordance with one exemplary embodiment.
Figure 8:
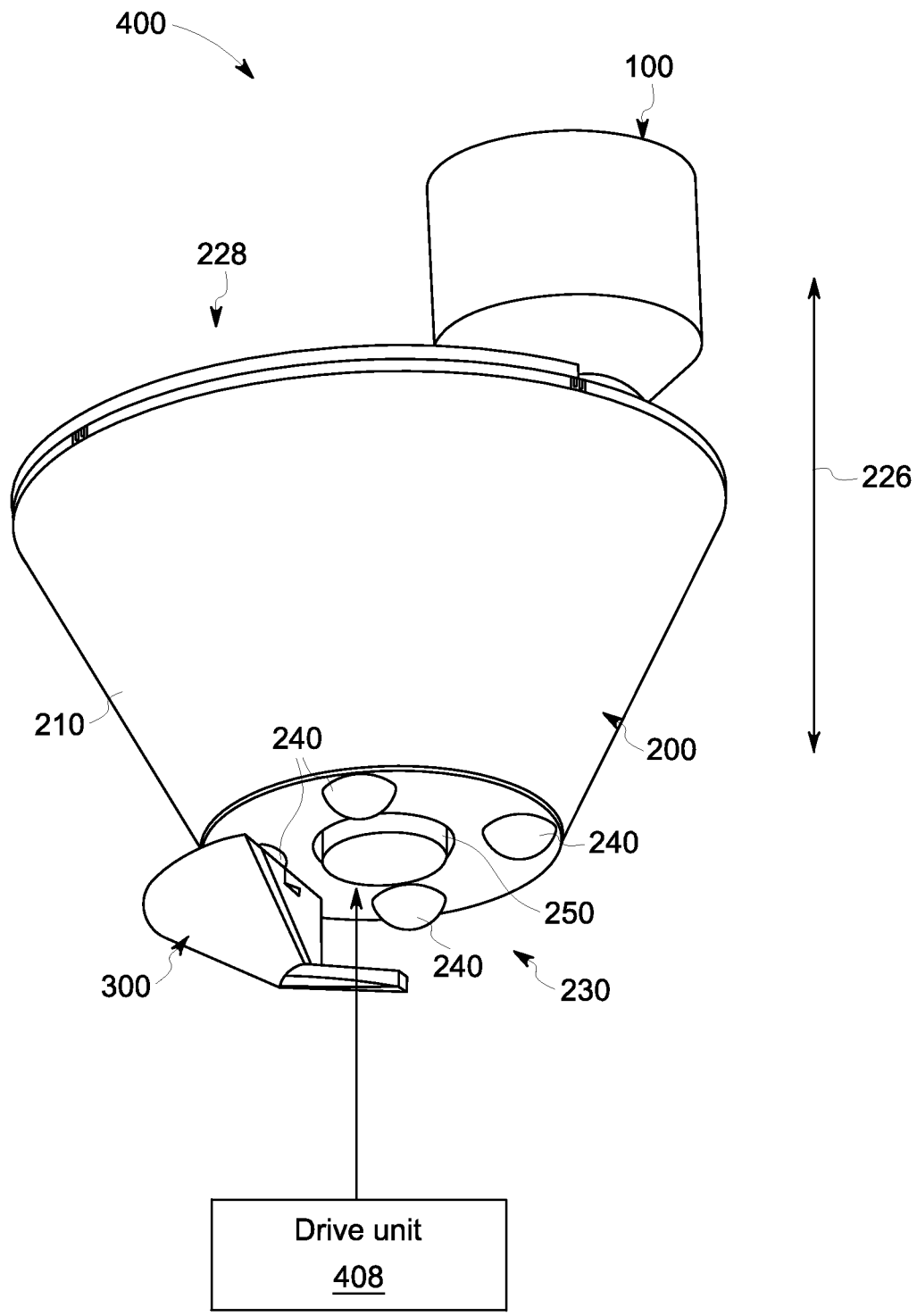
FIG. 8 is a perspective view of the feeder system including a drive unit in accordance with the exemplary embodiment of FIG. 7.

FIG. 3 illustrates a perspective view of the rotatable casing 210 and a plurality of valves 240 in accordance with one exemplary embodiment. The rotatable casing 210 further includes an inlet end 228, an outlet end 230 (as shown in FIG. 8), and a plurality of seals 232 coupled to the inlet end 228. Specifically, the plurality of seals 232 is disposed on the first outer-peripheral wall 220, the first inner-peripheral wall 222, and the plurality of first partition-walls 224. More specifically, the plurality of seals 232 includes a first circumferential seal 232a disposed on the first outer-peripheral wall 220, a second circumferential seal 232b disposed on the first inner-peripheral wall 222, and a plurality of rib seals 232c disposed on the plurality of first partition-walls 224. In the illustrated embodiment, the inlet end 228 is larger than the outlet end 230.

Each valve 240 is disposed at the outlet 216 (shown in FIG. 2) of the corresponding pocket 212a, 212b, 212c, 212d. The number of valves 240 is dependent on the number of pockets 212a, 212b, 212c, 212d formed in the rotatable casing 210. In one embodiment, each valve 240 is a ball valve. In other embodiments, the type of valve may vary depending on the application. The outlet 216 of each pocket 212a, 212b, 212c, 212d has a dimension smaller than a dimension of each valve 240. A portion of each valve 240 projects outward from the corresponding outlet 216 to dynamically seal the corresponding outlet 216 of the corresponding pocket 212a, 212b, 212c, 212d.

Figure 4:
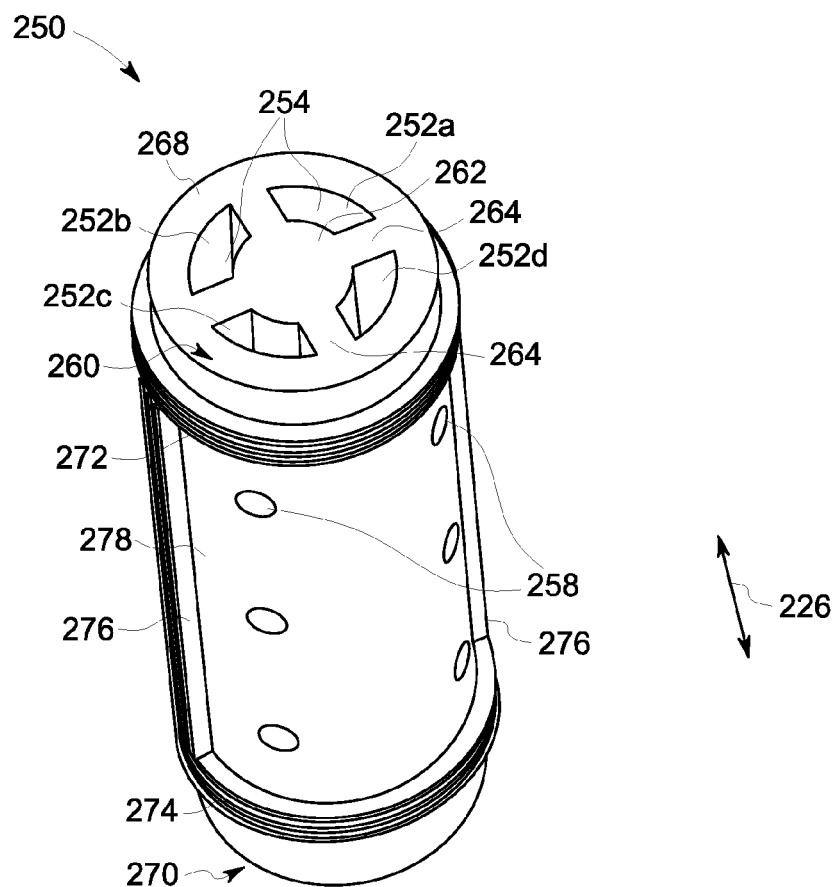
FIG. 4 is a perspective view of a stationary core of a feeder device in accordance with one exemplary embodiment.

FIG. 4 illustrates a perspective view of a stationary core 250 of a feeder device in accordance with one exemplary embodiment. In the illustrated embodiment, the stationary core 250 has a cylindrical shape and is configured to supply a pressurized fluid into the rotatable casing and extract the pressurized fluid from the rotatable casing. The shape of the stationary core 250 may vary depending on the application.

The stationary core 250 includes a plurality of channels 252a, 252b, 252c, 252d. Each channel 252a, 252b, 252c, 252d includes a plurality of second through-holes 258. Specifically, the stationary core 250 includes a second outer-peripheral wall 260, a second inner-peripheral wall 262, a plurality of second partition-walls 264 spaced apart from each other and extending from the second outer-peripheral wall 260 to the second inner-peripheral wall 262 to define the plurality of channels 252a, 252b, 252c, 252d. The second outer-peripheral wall 260 includes the plurality of second through-holes 258 corresponding to each channel 252a, 252b, 252c, 252d.

The number of channels may vary depending on the application and design criteria. As discussed previously, during operation, the rotatable casing is configured to rotate around the stationary core 250.

Figure 5:
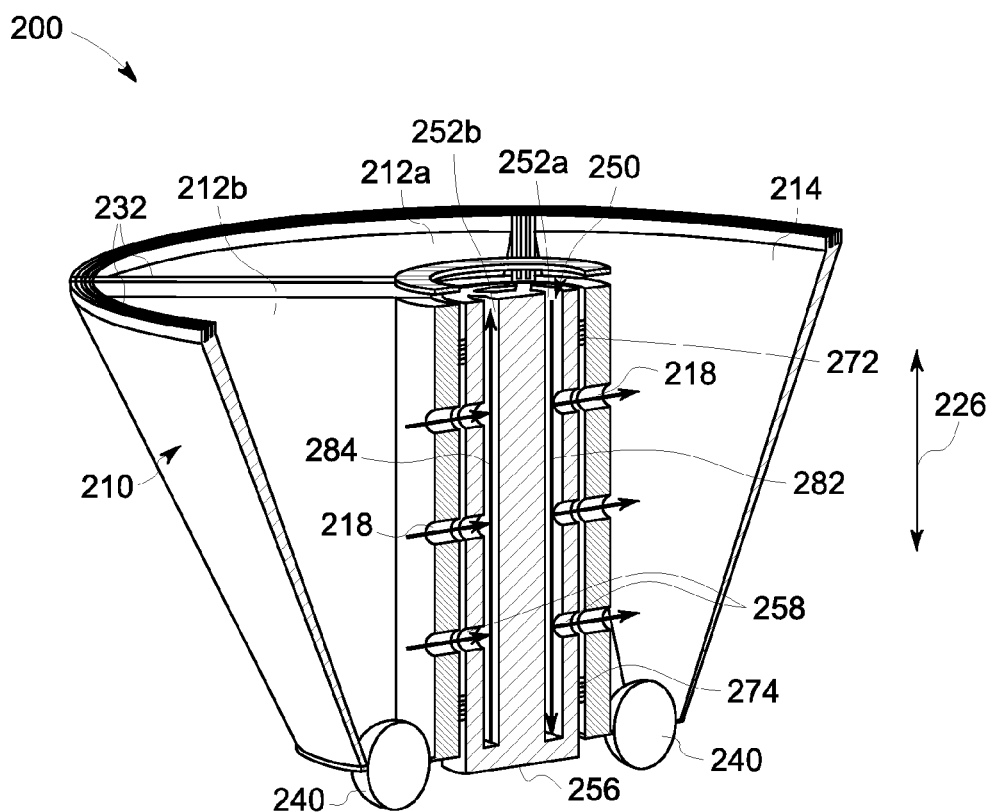
FIG. 5 is a partial perspective view of a feeder device in accordance with one exemplary embodiment.

The stationary core 250 further includes a first end 268 and a second end 270 opposite to the first end 268. The first end 268 has a plurality of inlets 254 corresponding to the plurality of channels 252a, 252b, 252c, 252d. The second end 270 has a closed section 256 (as shown in FIG. 5). The stationary core 250 further includes a first seal 272 coupled to the first end 268, a second seal 274 coupled to the second end 270, and at least two vertical seals 276 spaced apart from each other and coupled to the first and second seals 272, 274. In the illustrated embodiment, the first and second seals 272, 274 are ring seals. The first and second seals 272, 274 are disposed circumferentially around an outer surface 278 of the stationary core 250. The vertical seals 276 are disposed vertically along the outer surface 278 of the stationary core 250. The first and second seals 272, 274 are configured to seal the stationary core 250 from the atmospheric pressure. The vertical seals 276 are configured to isolate a high pressure side of the feeder device from a low pressure side of the feeder device. The term "high pressure side" refers to a portion of the stationary core 250 configured to inject a pressurized fluid through the plurality of second through-holes 258. The term "low pressure side" refers to another portion of the stationary core 250 configured to extract the pressurized fluid through the plurality of second through-holes 258.

FIG. 5 illustrates a partial perspective view of a feeder device 200 in accordance with one exemplary embodiment. The feeder device 200 includes the rotatable casing 210, the stationary core 250, and the plurality of valves 240.

The stationary core 250 is disposed within the rotatable casing 210. The rotatable casing 210 includes the plurality of pockets 212a, 212b, 212c, 212d, where each pocket 212a, 212b, 212c, 212d includes the inlet 214, the outlet 216 (as shown in FIG. 2), and the plurality of first through-holes 218. The stationary core 250 includes the plurality of channels 252a, 252b, 252c, 252d, where each channel 252a, 252b, 252c, 252d includes the plurality of second through-holes 258. During operation of the feeder device 200, the plurality of first and second through-holes 218, 258 are aligned to form a first fluid path 282 and a second fluid path 284 between the corresponding pocket 212a, 212b, 212c, 212d and the corresponding channel 252a, 252b, 252c, 252d.

Figure 6:
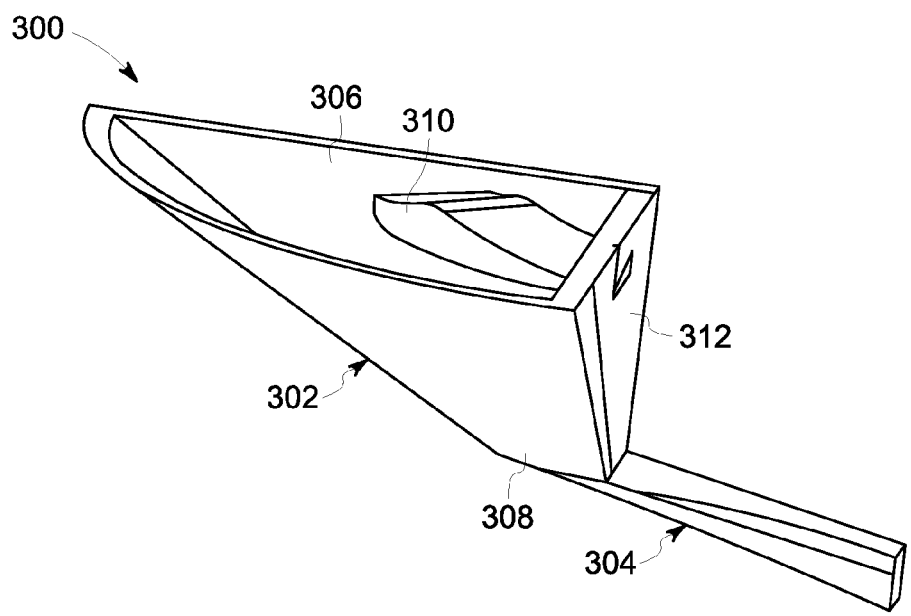
FIG. 6 is a perspective view of a discharge device in accordance with one exemplary embodiment.

FIG. 6 illustrates a perspective view of a discharge device 300 in accordance with one exemplary embodiment. The discharge device 300 is disposed downstream relative to the feeder device 200 (shown in FIG. 5) and configured to receive pressurized dry solids from the feeder device. The discharge device 300 is a stationary component and configured to intermittently contact the corresponding valve of the feeder device during rotation of the casing.

The discharge device 300 includes a receiving portion 302 and a guide portion 304 coupled to the receiving portion 302. In the illustrated embodiment, the receiving portion 302 has a funnel shape and includes an inlet 306 and an outlet 308. The receiving portion 302 further includes a valve actuator 310 coupled to a peripheral end wall 312 of the receiving portion 302. The valve actuator 310 is disposed protruding outwards from the receiving portion 302. In one embodiment, the valve actuator 310 is a projection.

The valve actuator 310 is configured to actuate each valve of the feeder device. During operation, the valve actuator 310 contacts the valve and pushes the valve upwards, thereby opening the outlet of the corresponding pocket and discharging the pressurized dry solids from the feeder device to the discharge device 300. Then the pressurized dry solids are fed via the guide portion 304 to a high pressure environment such as a pressurized blender of a $CO_2$ fracturing system.

Figure 7:
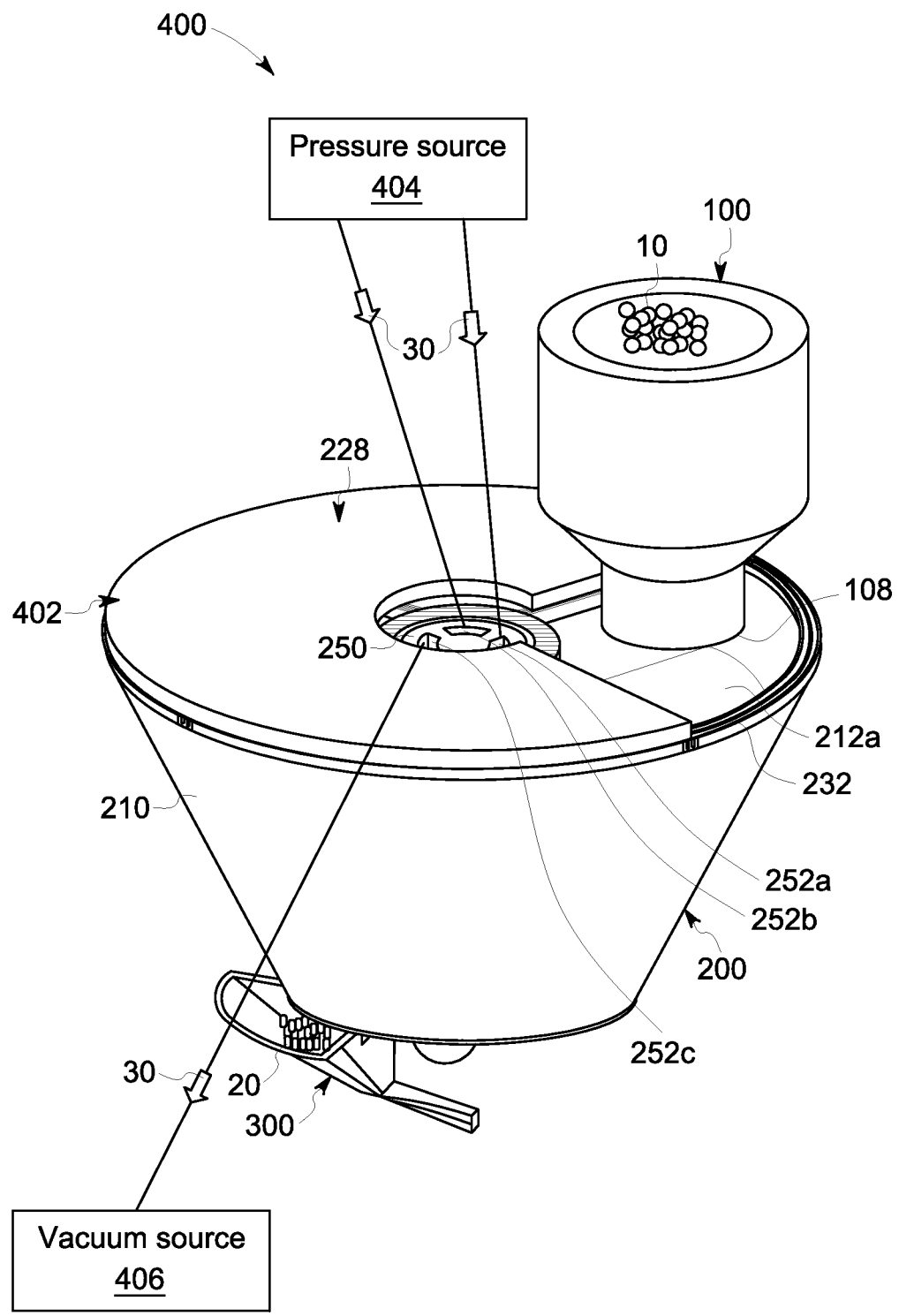
FIG. 7 is a perspective view of a feeder system in accordance with one exemplary embodiment.

FIG. 7 illustrates a perspective view of a feeder system 400 in accordance with one exemplary embodiment. In one embodiment, the feeder system 400 may be used for a $CO_2$ fracturing application. In such an embodiment, the feeder system 400 may be configured to pressurize proppant and feed a pressurized proppant to a blender containing a liquefied $CO_2$ fracturing fluid. In certain other embodiments, the feeder system 400 may be used in a wide range of industrial applications that require feeding dry solids into high pressure environments at high flow rates. Such industrial applications may include chemical processing, pharmaceuticals, food processing, paper and pulp, gasification, and the like.

The feeder system 400 includes the hopper 100, the feeder device 200, and the discharge device 300 as discussed in the embodiments of FIGS. 1-6. The hopper 100 is coupled to the feeder device 200 and the discharge device 300 is disposed downstream relative to the feeder device 200. During operation, the hopper 100 is configured to receive dry solids 10 at atmospheric pressure and feed the received dry solids 10 to the feeder device 200. The feeder device 200 is configured to pressurize the dry solids 10 and discharge pressurized dry solids 20 to the discharge device 300.

The feeder system 400 further includes a stationary cover 402, a pressure source 404, and a vacuum source 406. In the illustrated embodiment, only a portion of the stationary cover 402 is shown to simplify the illustration of the feeder system 400. The stationary cover 402 is configured to substantially cover the inlet end 228 of the rotatable casing 210. In certain specific embodiments, the stationary cover 402 is disposed on the plurality of seals 232 coupled to the inlet end 228 of the feeder device 200. The stationary cover 402 further includes an opening 108 for feeding the dry solids from the hopper 100 to the feeder device 200. The plurality of seals 232 and the stationary cover 402 are configured to seal the rotatable casing 210 from atmospheric pressure and to isolate the plurality of pockets 212a, 212b, 212c, 212d within the rotatable casing 210.

The pressure source 404 is fluidically coupled to at least one channel 252a, 252b, 252c, 252d of the stationary core 250. The pressure source 404 is configured to supply a pressurized fluid 30 to at least one corresponding pocket 212a, 212b, 212c, 212d of the rotatable casing 210 through the corresponding plurality of first and second through-holes. In certain embodiments, the pressure source 404 is fluidically coupled to two mutually adjacent channels, for example, 252a, 252b of the stationary core 250. In one embodiment, the pressure source 404 is configured to feed compressed air. The type of pressure source 404 may vary depending on the application.

The vacuum source 406 is fluidically coupled to at least one channel 252a, 252b, 252c, 252d of the stationary core 250. The vacuum source 406 is configured to extract the pressurized fluid from at least one corresponding pocket 212a, 212b, 212c, 212d of the rotatable casing 210 through the corresponding plurality of first and second through-holes. In certain embodiments, the vacuum source 406 is fluidically coupled to another two mutually adjacent channels, for example, 252c, 252d of the stationary core 250.

FIG. 8 illustrates a perspective view of the feeder system 400 including the drive unit 408 in accordance with the exemplary embodiment of FIG. 7. The feeder system 400 includes a drive unit 408 such as a motor coupled to the outlet end 230 of the rotatable casing 210. The drive unit 408 is configured to drive the rotatable casing 210 about the stationary core 250 of the feeder device 200. In such embodiments, the rotatable casing 210 rotates about the central axis 226 of the feeder system 400.

During operation, each pocket 212a, 212b, 212c, 212c moves through a plurality of stages to discharge dry solids at a substantial high pressure into the high pressure environment. The plurality of stages include i) a feeding stage, ii) a pressurizing stage, a discharging stage, and iv) a de-pressurizing stage. In certain embodiments, the dry solids may be proppant. In some other embodiments, the dry solids may include powdered coals, sand, bio-mass mixtures, sawdust, wood chips, powdered chemicals, and the like.

Figure 9:
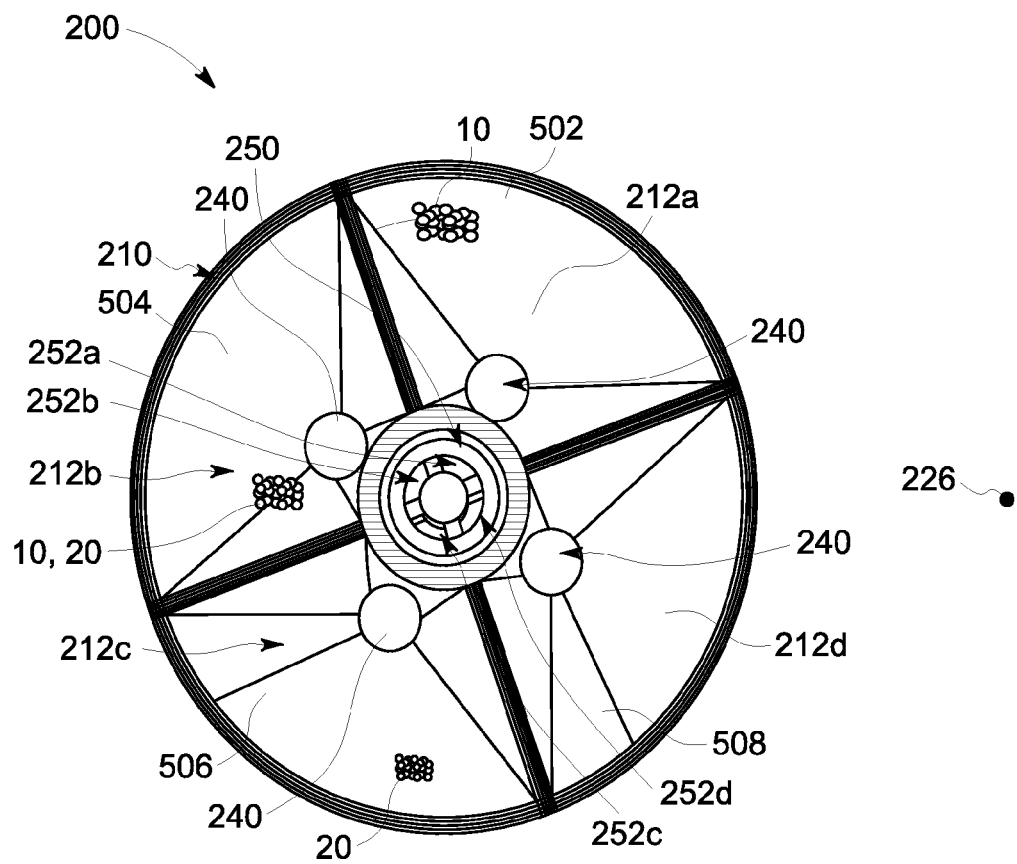
FIG. 9 is a schematic perspective view of a feeder device in accordance with the exemplary embodiments of FIGS. 7 and 8.

FIG. 9 illustrates a schematic top view of the feeder device 200 in accordance with the exemplary embodiments of FIGS. 7 and 8. The feeder device 200 moves through a plurality of stages such as i) a feeding stage 502, ii) a pressurizing stage 504, iii) a discharging stage 506, and iv) a de-pressurizing stage 508. In the illustrated embodiment, during the feeding stage 502, the dry solids 10 at atmospheric pressure are fed from the hopper into the pocket 212a, for example, of the rotatable casing 210 of the feeder device 200. The metering device is used to regulate the feeding of the dry solids from the hopper 100 to the pocket 212a. In such an embodiment, the pressure source is actuated to simultaneously inject a pressurized fluid to the first pocket 212a through a corresponding channel 252a and the corresponding plurality of first and second through-holes.

The drive unit further drives the rotatable casing 210 about the stationary core 250 such that the first pocket 212a moves from the feeding stage 502 to the pressurizing stage 504. As a result, the subsequent pocket 212d moves to the feeding stage 502.

During the pressurizing stage 504, for example, the pressure source injects the pressurized fluid to the first pocket 212a through a corresponding channel 252b and the corresponding plurality of first and second through-holes. The dry solids 10 are pressurized from about 0 psig to about at least 80 psig to form pressurized dry solids 20. The drive unit further drives the rotatable casing 210 about the stationary core 250 such that the pocket 212a moves from the pressurizing stage 504 to the discharging stage 506. The pocket 212b moves from the feeding stage 502 to the pressurizing stage 504.

During the discharging stage 506, the valve actuator of the discharge device opens a corresponding valve 240 of the pocket 212a for discharging the pressurized dry solids 20 to the discharge device. In such an embodiment, the vacuum source is actuated to simultaneously extract the pressurized fluid from the pocket 212a through a corresponding channel 252c and the corresponding plurality of first and second through-holes. The discharging stage 506 is explained in greater detail below with reference to FIG. 10. The drive unit further drives the rotatable casing 210 about the stationary core 250 such that the pocket 212a moves from the discharging stage 506 to the de-pressurizing stage 508. The second pocket 212b moves from the pressurizing stage 504 to the discharging stage 506.

During the de-pressurizing stage 508, the vacuum source continues to extract the pressurized fluid from the pocket 212a through a corresponding channel 252d and the corresponding plurality of first and second through-holes so as to de-pressurize the pocket 212a. The pocket 212b moves from the discharging stage 506 to the de-pressurizing stage 508.

Similarly, the drive unit is configured to continuously drive the rotatable casing 210 for moving each pocket to different stages 502, 504, 506, 508 of the feeder system 400.

Figure 10:
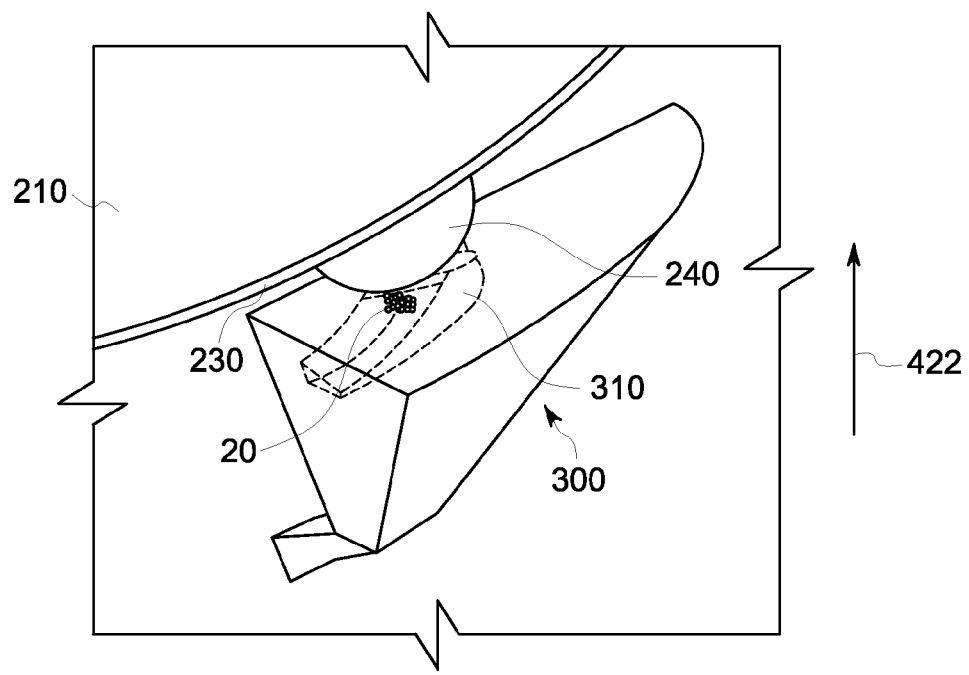
FIG. 10 is a schematic view of a discharge device and a valve in accordance with the exemplary embodiments of FIGS. 7, 8, and 9.

FIG. 10 illustrates a schematic perspective view of the discharge device 300 and the corresponding valve 240 in accordance with the exemplary embodiments of FIGS. 7, 8, and 9. As discussed previously, during the discharging stage 506, the valve actuator 310 of the discharge device 300 opens the corresponding valve 240 of the pocket 212a for discharging the pressurized dry solids 20 to the discharge device 300. Specifically, the valve actuator 310 contacts and pushes the corresponding valve 240 upwards as indicated by reference numeral 422, to open the outlet end 230 of the pocket 212a, thereby allowing the pressurized dry solids 20 to discharge from the first pocket 212a to the discharge device 300.

Figure 11:
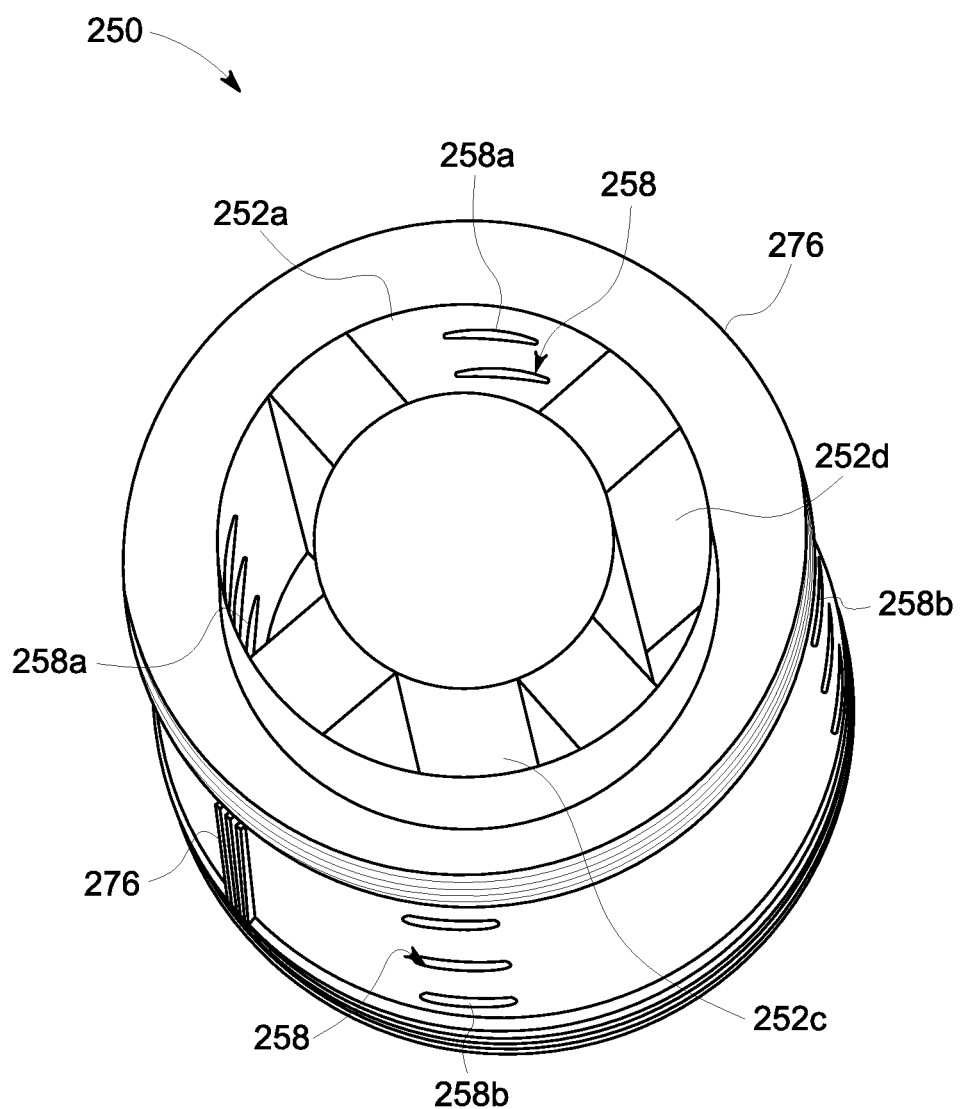
FIG. 11 is a schematic perspective view of a stationary core in accordance with the exemplary embodiments of FIGS. 7, 8, 9, and 10.

FIG. 11 is a schematic perspective view of the stationary core 250 in accordance with the exemplary embodiments of FIGS. 7, 8, 9, and 10. In one embodiment, the channels 252a, 252b may be referred to as high pressure supply lines, which are configured to supply the pressurized fluid to the corresponding pockets 212a, 212b (shown in FIG. 9). The channels 252c, 252d may be referred to as vent lines, which are configured to extract the pressurized fluid from the corresponding pockets 212c, 212d (shown in FIG. 9). In the illustrated embodiment, the plurality of second through-holes 258 includes a first set of through-holes 258a configured for injecting the pressurized fluid and a second set of through-holes 258b configured for extracting the pressurized fluid. The first set of through-holes 258a is separated from the second set of through-holes 258b through the at least two vertical seals 276 disposed along the stationary core 250 (shown in FIG. 4).

In accordance with one or more embodiments discussed herein, an exemplary feeder system is configured to continuously feed dry solids to a high pressure environment. The feeder system is designed to discharge incompressible and abrasive dry solids. The feeder system is configured to rotate about a vertical axis, thereby reducing bending stresses imparted by the pressurized fluid on the outlet side of the device, thereby enhancing pressure capability of the feeder system under high pressure conditions compared to conventional rotary valve devices. In conventional rotary valve systems, dry solids may get trapped between clearances formed between rotor tips and housing body, resulting in wear of the rotor and housing body, and rapid degradation of sealing performance over time. In accordance with the embodiments of the present disclosure, such clearances are eliminated, resulting in less wear compared to the conventional systems. Further, components, such as valves, which are also susceptible to wear, are easily replaceable in accordance with embodiments of the present disclosure.

While only certain features of embodiments have been illustrated and described herein, many modifications and changes will occur to those skilled in the art. It is, therefore, to be understood that the appended embodiments are intended to cover all such modifications and changes as falling within the spirit of the invention.

The invention claimed is:
1. A method comprising:
    (i) feeding dry solids at atmospheric pressure, from a hopper into a first pocket among a plurality of pockets formed in a rotatable casing of a feeder device, wherein each pocket comprises an inlet, an outlet, and a plurality of first through-holes, and wherein the feeder device comprises a plurality of valves, each valve being disposed at the outlet of a corresponding pocket from the plurality of pockets;
    (ii) driving the rotatable casing about a stationary core of the feeder device, disposed within the rotatable casing, wherein the stationary core comprises a plurality of channels, each channel comprising a plurality of second through-holes;
    (iii) injecting a portion of a pressurized fluid from a first channel among the plurality of channels into the first pocket through the plurality of corresponding second through-holes and the plurality of corresponding first through-holes, to generate pressurized dry solids;
    (iv) actuating a corresponding valve from the plurality of valves through a valve actuator of a discharge device, for discharging the pressurized dry solids from the first pocket into the discharge device; and
    (v) extracting the portion of the pressurized fluid from the first pocket through the plurality of corresponding first and second through-holes and the first channel.

2. The method of claim 1, further comprising repeating the steps of (i) to (v) for a second pocket among the plurality of pockets of the feeder device.

3. The method of claim 2, further comprising injecting second portion of the pressurized fluid during the step (i).

4. The method of claim 3, further comprising extracting the second portion of the pressurized fluid during the step (iv).

5. The method of claim 1, further comprising sealing the rotatable casing, using a plurality of seals and a stationary cover, wherein the stationary cover is disposed on the plurality of seals which is coupled to an inlet end of the rotatable casing.

6. The method of claim 5, further comprising sealing the stationary core, using a first seal coupled to a first end and a second seal coupled to a second end of the stationary core.

7. The method of claim 6, further comprising separating a first set of through-holes among the plurality of second through-holes, configured for injecting the portion of the pressurized fluid, from a second set of through-holes among the plurality of second through-holes, configured for extracting the portion of the pressurized fluid, through at least two vertical seals spaced apart from each other and coupled to the first and second seals.

8. The method of claim 1, further comprising regulating the feeding of the dry solids from the hopper to the feeder device through a metering device disposed in the hopper.

9. The method of claim 1, wherein the dry solids comprise incompressible and abrasive solids.

\* \* \* \* \*